(No Model.)
M. I. GRIFFITH.
BAKE PAN.
No. 508,305. Patented Nov. 7, 1893.
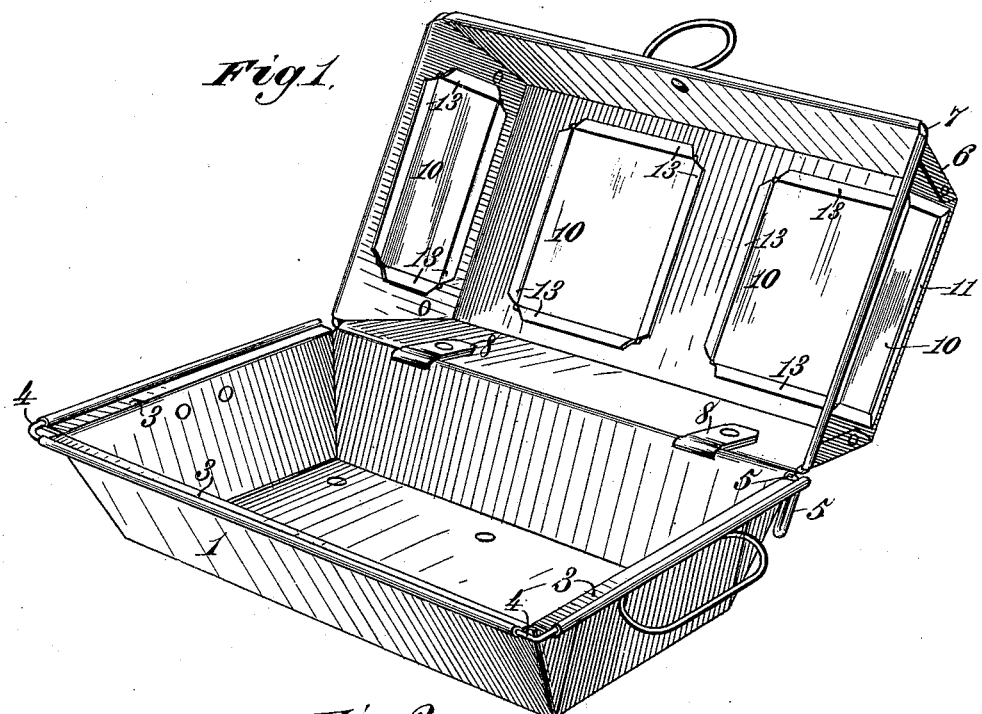
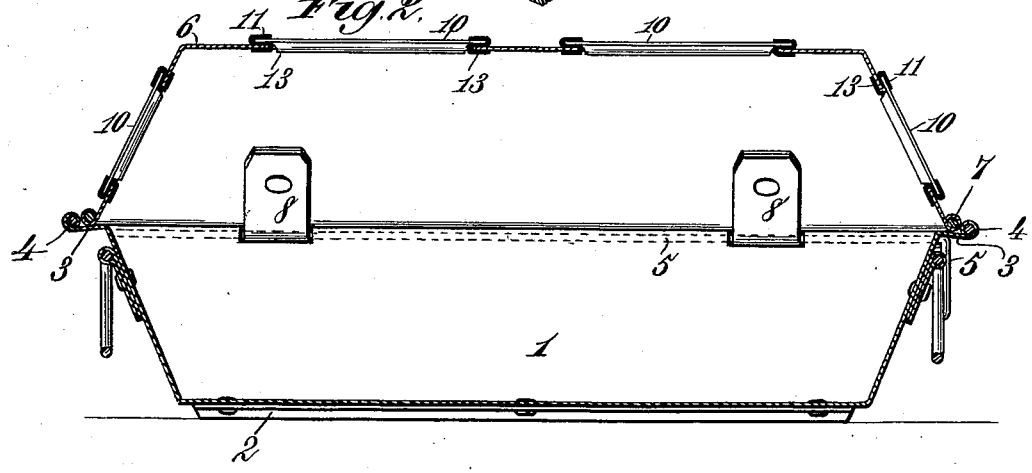
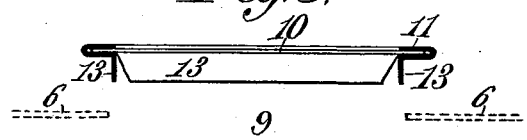
Witnesses.
Inventor.
Mollie I. Griffith.
By James L. Norris.
Atty.
THE NATIONAL LITHOGRAPHING COMPANY,
WASHINGTON, D. C.

UNITED STATES PATENT OFFICE.

MOLLIE I. GRIFFITH, OF WINCHESTER, KENTUCKY.

BAKE-PAN.

SPECIFICATION forming part of Letters Patent No. 508,305, dated November 7, 1893.

Application filed August 21, 1893. Serial No. 483,643. (No model.)

*To all whom it may concern:*

Be it known that I, MOLLIE I. GRIFFITH, a citizen of the United States, residing at Winchester, in the county of Clark and State of Kentucky, have invented new and useful Improvements in Bake-Pans, of which the following is a specification.

My invention relates to improvements in pans adapted for baking bread, cake or other food and for roasting or baking meats, and it has for its object the provision of novel means and arrangement for securing sheets of mica or other transparent material in or over the sight or inspection windows hereinafter referred to, such means serving to protect the edges of the mica or other transparent sheets from becoming torn or broken in use, and to secure such sheets firmly in place and form an air-tight connection with the cover of the pan.

To this end my invention consists in the novel construction and combination of parts hereinafter described and claimed, reference being made to the accompanying drawings, wherein—

Figure 1 is a perspective view of a pan constructed in accordance with my invention, the hinged cover being thrown open. Fig. 2 is a longitudinal sectional view thereof, and Fig. 3 is a detail view of the pocket with the mica or other transparent sheet ready to be inserted in a window or aperture formed therefor in the cover of the pan.

In the said drawings the reference numeral 1 designates the body of my improved baking or roasting pan, having rectangular oblong bottom and flaring front, rear and end walls. To the under side of the said bottom, legs 2 are secured at front and rear, only one of which is shown, in Fig. 2; whereby the pan is supported on the oven surface or other baking or roasting surface, the bottom of the pan being out of contact with such surface. Handles are secured to the flaring end walls, by which the pan is handled.

The end walls and the front wall are flared outwardly at their upper edges to provide a substantially continuous flange 3, around the front and ends of the body of the pan, the outer end of said flange being wrapped or turned about a supporting and stiffening wire 4. This flange 3, forms a seat for the lower end of the cover, hereinafter described.

The top edge of the rear wall of the body of the pan is turned over a support wire 5, which forms one member of the hinge by which the cover is secured to the pan body, and is provided with a handle portion by which it may be withdrawn and the pan cover and body detached, when necessary or desirable.

The numeral 6 represents my improved cover for the pan body having a rectangular oblong top surface and depending, flaring front, rear and end walls, which at their lower edges are turned around a strengthening or stiffening wire 7. The dimensions of the cover 6 are slightly less, both from front to rear and from end to end, than the dimensions of the body 1, so that when closed upon said body the lower edge of the cover rests or seats upon the flange 3, hereinbefore described, whereby a close substantially air-exclusive connection is made.

Secured at one end to the rear wall of the cover 6, are two metallic strips 8, the other ends of which are wrapped or turned around the wire 5, completing the hinge connection of the pan body and cover. The metal of the rear wall of the body 1, is cut away at the proper points to permit the connection of the metallic strips 8, with the wire 5, as shown. A suitable handle is attached to the cover whereby it may be opened and closed upon the body of the pan.

I have described a preferred construction of pan, to which my invention is adapted to be applied, but I do not wish to be understood as confining my invention to its application to pans of such description solely, as it is equally applicable to other constructions of pans.

In the flaring or inclined end walls and in the top surface of the cover 6, I provide rectangular apertures or inspection windows 9, which are closed or covered by sheets 10 of mica or other suitable transparent material, said sheets being secured in the apertures or windows as now described.

The numeral 11 indicates rectangular pockets or frames for receiving and securing the mica sheets 10 in the apertures or windows 9. Each of said pockets or frames 11 is constructed of a skeleton sheet metal or tin blank, upon which is laid a sheet of mica. The outer edge of the pocket or frame is then turned or lapped over upon and pressed close to the sheet of mica and its inner edge pressed closely upon the inner side of the mica sheet until the inner and outer edges of the pocket or frame overlap the inner and outer surfaces of the sheet of mica an equal distance, as shown clearly in the drawings. The inner edge of the pocket or frame is then bent at right angles to the sheet of mica, as shown best in Fig. 3, to form locking wings 13, which are inserted into the apertures or inspection windows 9, and folded over upon the cover of the pan, as clearly shown in Fig. 1. By the employment of my improved pockets or frames the sheets of mica are securely fixed in the apertures in an air-tight manner and the edges of the sheets effectively protected against being torn or broken in use. Yet when any of the sheets become defective or useless by reason of extraneous causes, it or they may be readily removed by turning the locking wings 13 to a position at right angles to the mica sheet and bodily removing the pocket or frame from the aperture or window 9, substituting a new sheet and securing the same in the aperture or window, as before described. By providing an inspection window or windows, the progress of the baking or roasting can readily be inspected without raising said cover, thus avoiding loss of heat in the pan and consequent retardation of the baking or roasting process. It is evident also that in the preferred form of pan herein described and illustrated the provision of a plurality of inspection windows is also useful and desirable in another view, in that if only a single window were provided but little light would enter the pan through the window with which to inspect the progress of the baking, thus rendering the inspection imperfect, uncertain and entirely unsatisfactory; whereas by the provision of more than one inspection window, light enters and discloses the entire contents of the pan to the attendant. And again when only a single window is provided a portion only of the material being roasted or baked can be inspected; whereas when as in my invention, windows in both ends and top of the cover are provided, all parts of the article being cooked or roasted are exposed to view.

Having thus described my invention, what I claim is—

The combination with a baking or roasting pan provided with an aperture or inspection window, of a sheet of transparent material, and a skeleton pocket or frame, one part of which is turned or lapped over the inner and outer surfaces of said sheet of transparent material, and the other part of which is formed into locking wings which are passed through the aperture or inspection window and folded over upon the pan, substantially as described.

In testimony whereof I have hereunto set my hand in presence of two subscribing witnesses.

MOLLIE I. GRIFFITH.

Witnesses:
 JNO. D. POYNTER,
 WM. GRIFFITH.